United States Patent [19]

Asada

[11] Patent Number: 4,721,233

[45] Date of Patent: Jan. 26, 1988

[54] POWDER FEEDING APPARATUS

[75] Inventor: Mamoru Asada, Numazu, Japan

[73] Assignee: Akatake Engineering Co., Ltd., Shizuoka, Japan

[21] Appl. No.: 773,977

[22] Filed: Sep. 9, 1985

[51] Int. Cl.⁴ .................. G01F 11/02; G01F 11/36
[52] U.S. Cl. ................... 222/245; 222/308; 222/440; 222/447
[58] Field of Search .............................. 222/282–285, 222/287, 216, 305, 307, 308, 344, 361, 440, 434–436, 438, 447, 450, 451, 430, 226, 228, 232, 233, 245, 247, 248; 221/207, 241, 263

[56] References Cited

U.S. PATENT DOCUMENTS

| | | | |
|---|---|---|---|
| 601,739 | 4/1898 | Stewart et al. | 222/447 |
| 1,173,768 | 2/1916 | Byerley | 222/447 |
| 1,320,250 | 10/1919 | Llewellyn | 222/245 |
| 1,803,656 | 5/1931 | Schuler | 221/264 X |
| 2,164,618 | 7/1939 | Masters | 222/247 |
| 2,318,725 | 5/1943 | Thomas | 222/447 X |
| 2,730,284 | 1/1956 | Hutchinson | 222/308 X |
| 3,163,333 | 12/1964 | Lindaberry | 222/308 X |
| 3,330,311 | 7/1967 | Christine et al. | 222/361 X |
| 4,289,258 | 9/1981 | Ransom | 222/308 |

Primary Examiner—Joseph J. Rolla
Assistant Examiner—Kevin P. Shaver
Attorney, Agent, or Firm—Beveridge, DeGrandi & Weilacher

[57] ABSTRACT

A powder feeding apparatus comprising a powder storage receptacle for defining a space to hold a powder and a metering chamber disposed beneath the holding space for receiving the powder flowing from the holding space. The powder is metered in the metering chamber and discharged. The apparatus includes a metering section having a metering space for defining the metering chamber and a metering adjusting member disposed slidably in the metering space of the metering section. The volume of the metering chamber is adjusted by sliding the metering adjustment member.

3 Claims, 5 Drawing Figures

4,721,233

POWDER FEEDING APPARATUS

BACKGROUND OF THE INVENTION

1. Field of the Invention

This invention relates to a powder feeding apparatus, and more specifically, to a powder feeding apparatus for automatically metering a powder of a relatively light weight and continuously feeding it.

2. Description of the Prior Art

As is well known to those skilled in the art, an apparatus of the type comprising a powder storage receptacle and a metering chamber disposed in the lower part of the receptacle has been widely used for feeding a powder of a relatively light weight such as a powdery drug and a powdery soup. In this type of powder feeding apparatus, a powder is stored in the powder storage receptacle, and caused to flow into the metering chamber. A predetermined amount of the powder is metered and discharged from the metering chamber.

In the above-described conventional type of powder feeding apparatus, a recess or through-hole formed in a metering section (such as a turntable) disposed in the lower part of the powder storage receptacle defines part or the whole of the metering chamber. Because of this structure, the conventional powder feeding apparatus has the following defect or inconvenience. When a powder is to be filled in various containers or bags of different shapes, the amount of the powder to be fed should be adjusted according to the sizes of the containers or bags. In the conventional powder feeding apparatus, the volume of the metering chamber is adjusted by inserting plate members of various thicknesses into the metering chamber. Hence, the operation of adjusting the volume of the metering chamber is complex. In particular, when a plurality of recesses or through-holes are formed in the metering section to define the metering chamber, they have to be adjusted individually, and the volume adjusting operation becomes very complex.

SUMMARY OF THE INVENTION

It is a primary object of this invention to provide an improved powder feeding apparatus in which the volume of a metering chamber for metering a powder can be adjusted easily and rapidly.

Other objects of this invention will become apparent from the following detailed description taken in conjunction with the accompanying drawings.

According to this invention, there is provided a powder feeding apparatus comprising a powder storage receptacle defining a space to hold a powder, and a metering chamber disposed beneath said space and adapted to receive the powder from said space, meter the powder and then discharge it, said apparatus including a metering section having a metering space for defining the metering chamber and a metering adjustment member disposed slidably in said metering space and adapted to adjust the volume of the metering chamber freely by its sliding movement.

DETAILED DESCRIPTION OF PREFERRED EMBODIMENTS

The present invention is described in detail with reference to the accompanying drawings.

Figure 1:
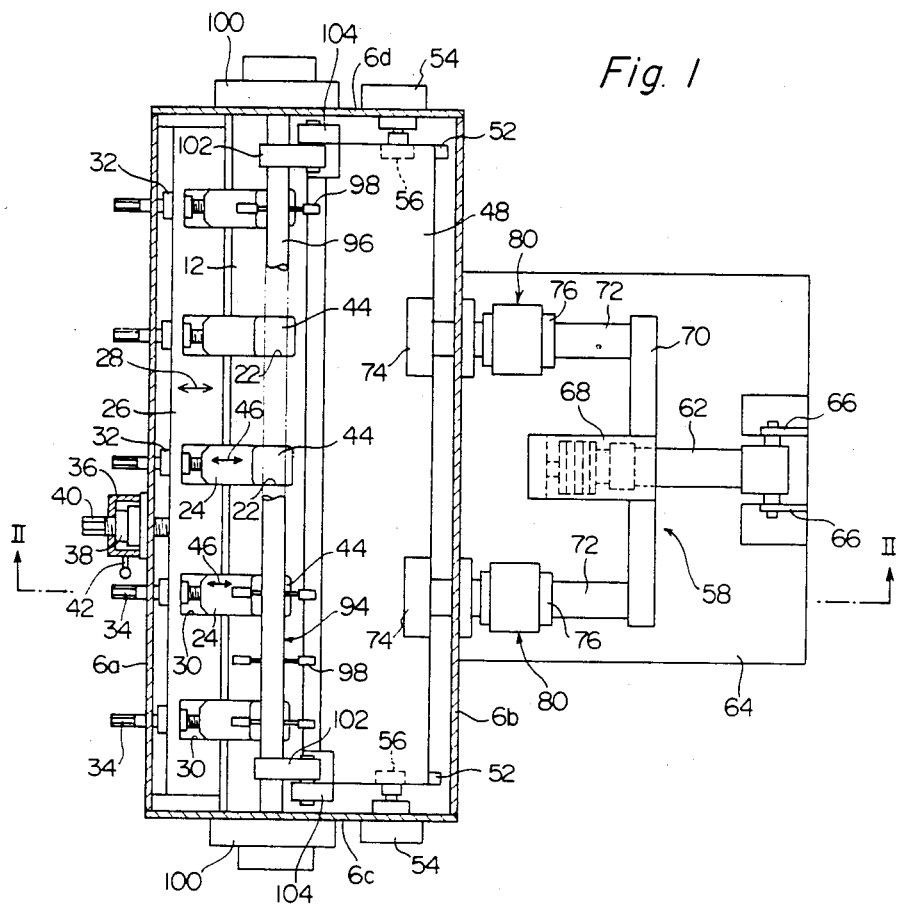
FIG. 1 is a top plan view, partly in section, of a first embodiment of a powder feeding apparatus constructed in accordance with this invention.
Figure 2:
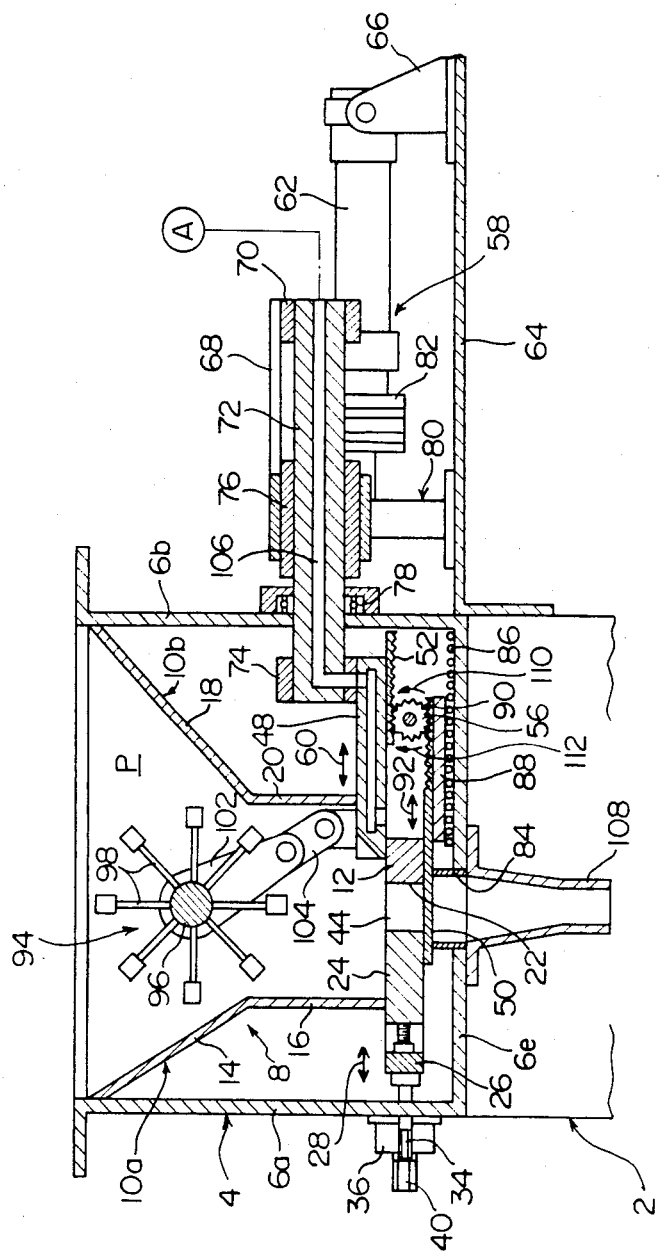
FIG. 2 is a sectional view taken on line II—II of FIG. 1.

First, with reference to FIGS. 1 and 2, the first embodiment of the powder feeding apparatus of this invention will be described. In FIGS. 1 and 2, the powder feeding apparatus shown includes a lower section 2 and a housing 4 for an upper section secured to the lower section 2. The housing 4 has a rectangular cross-sectional shape and includes side walls 6a, 6b, 6c and 6d. Within the housing 4 are disposed plate members 10a and 10b (not shown in FIG. 1) constituting a powder storage receptacle 8 and a stationary member 12 constituting a metering section. Each of the plate members 10a and 10b extends entirely between the side walls 6c and 6d of the housing 4, and both end portions of each plate members 10a and 10b are fixed to the inside surfaces of the side walls 6c and 6d. The plate member 10a has an inclined portion 14 extending inclinedly from the upper end portion of the side wall 6a of the housing 4 inwardly downwardly and a downwardly extending portion 16 extending downwardly substantially perpendicularly from the lower end of the inclined portion 14, and the other plate member 10b likewise has an inclined portion 18 extending inclinedly from the upper end portion of the side wall 6b of the housing 4 inwardly downwardly and a downwardly extending portion 20 downwardly extending substantially perpendicularly from the lower end of the inclined portion 18 (see FIG. 2). Thus, in the illustrated embodiment, the inner surfaces of the side walls 6c and 6d of the housing 4 and the inner surfaces of the plate members 10a and 10b define a space P for holding a powder (such as a powdery drug or a powdery soup).

The aforesaid stationary member 12 is disposed beneath the holding space P. The stationary member 12 is formed of an elongate block-like member, and its one end is fixed to the inner surface of the side wall 6c and its other end, to the inner surface of the side wall 6d. A plurality of (5 in the illustrated embodiment) metering recess 22 (forming a metering space) for defining a metering chamber are formed longitudinally at spaced intervals in one side end portion (the left end portion in FIGS. 1 and 2) of the stationary member 12. As will be understood from the following description, the metering recesses 22 are preferably substantially rectangular in cross section. On the opening side of each of the metering recesses 22, a block-like metering adjusting member 24 having a sectional shape corresponding to the sectional shape of the recess 22 is slidably disposed. In the lower portion of the housing 4 is disposed a movable member 26 facing one side end portion of the stationary member 12. The movable member 26 is constructed of an elongate block-like member and is supported between the side walls 6c and 6d of the housing 4 such that it can move in the direction shown by an arrow 28 (namely, in a direction toward or away from the stationary member 12). On one side end portion of the movable member 26 (that side which faces one side end portion of the stationary member 12) are formed a plurality of mounting recesses 30 at predetermined intervals in the longitudinal direction corresponding respectively to the metering recesses 22 formed in the stationary member 12. The aforesaid metering adjusting member 24 is slidably mounted on each of the mounting recesses 30. In the illustrated embodiment, an adjusting rod 34 is rotatably mounted on the bottom portion of each of the mounting recesses 30 via a supporting member 32, and an external thread portion formed on one end of the adjusting rod 34 is fitted with an internal thread formed on the rear end surface of the metering adjusting member 24. An engaging surface is formed on the other end of the adjusting rod 34, and the other end of the rod 34 extends outwardly of the housing 4 through a hole formed in the side wall 6a. On the outside surface of a nearly intermediate part of the side wall 6a is rotatably mounted an adjusting rod 40 having an external thread portion formed at one end portion thereof via a supporting member 38 fixed by a cylindrical fixing member 36, and one end portion of the external thread portion of the adjusting rod 40 which projects inwardly from the side wall 6a is fitted into an internal thread formed on the surface of the other side end of the movable member 26. The other end of the adjusting rod 40 having an engaging surface formed therein projects outwardly through the end wall of the fixing member 36. A lever 42 is fixed to the peripheral surface of the fixing member 36 in order to revolve the fixing member 36. Thus, each of metering chambers 44 for metering a powder is defined by the bottom surface and both side surfaces of each metering recess 22 formed in the stationary member 12, and the forward end surface of the metering adjusting member 24 disposed on the opening side of the metering recess 22. The volumes of the metering chambers 44 are individually varied by moving the metering adjusting members 24 in the direction of an arrow 46 (in a direction toward or away from the stationary member 12) along the mounting recesses 30 of the movable member 26 and the metering recesses 22 of the stationary member 12. By moving the movable member 26 in the direction of arrow 28, the volumes of all the metering chambers 44 are varied at a time.

Within the housing 4, an upper shutter member 48 is disposed above the stationary member 12, and a lower shutter member 50, below the stationary member 12. The upper shutter member 48 disposed between the lower portion of the powder storage receptacle 8 and the upper surface of the stationary member 12 extends through a cut formed on the under edge of the plate member 10b and its one side end portion projects into the holding space P. To the under surface of both end portions of the upper shutter member 48 are respectively fixed rack members 52 (only one of them is shown in FIG. 2) having a rack formed on the under surface thereof. The rack of the each rack member is in mesh with a pinion 56 rotatably mounted on the side walls 6c and 6d via a supporting member 54. The upper shutter member 48 is moved reciprocally in the direction of an arrow 60 by a shutter moving mechanism 58. The shutter moving mechanism 58 includes a fluid pressure cylinder mechanism 62 such as a pneumatic cylinder, and the head portion of the fluid pressure cylinder mechanism 62 is pivotably connected to a pair of mounting brackets 66 fixed to the upper surface of the forward end of a supporting stand 64 fixed to one side surface of the lower section 2 of the apparatus. The rod portion of the fluid pressure cylinder mechanism 62 is connected to a connecting rod 70 via a connecting member 68. One end of each of sliding rods 72 is fixed to each of the two end portions of the connecting rod 70, and the other end of each of the sliding rods 72 is fixed to each of mounting blocks 74 provided in the other side end portion of the upper shutter member 48 in spaced-apart relationship. The sliding rod 72 is slidably supported between a supporting mechanism 80 fixed to the supporting stand 64 and the side wall 6b via supporting members 76 and 78, respectively. Because of the above-described structure, when the fluid pressure cylinder mechanism 62 is stretched and contracted, the upper shutter member 48 is reciprocated in the direction of arrow 60 via the connecting member 68, the connecting rod 70 and the pair of sliding rods 72. In the specific embodiment, the rod portion of the fluid pressure cylinder mechanism 62 is covered with a stretchable protective cover 82.

The lower shutter member 50 is disposed between the lower surface of the stationary member 12 and a plurality of cylindrical members 84 which are set in an opening portion of a plurality of discharge openings formed in the bottom wall 6e of the housing 4 (each of the opening is formed below each metering recess 22.) The lower shutter member 50 is formed of a plate-like member, and fixed to a moving member 88 disposed movably on the bottom wall 6e via a slide bearing 86. Rack members 90 (only one of them is shown in FIG. 2) having a rack formed on the upper surface thereof respectively are fixed to the uppers of both end portions of the moving member 88, and the racks are in mesh with the pinions 56. Because of this structure, when the upper shutter member 48 is reciprocated in the direction of arrow 60, the pinions 56 are revolved to move the lower shutter member 50 reciprocally in the direction of an arrow 92.

An agitation means 94 is further disposed within the holding space P. The agitation means 94 includes a rotating shaft 96 and blades 98 fixed to the rotating shaft 96 at axially spaced intervals. Both end portions of the rotating shaft 96 are rotatably mounted between the side walls 6c and 6d of the housing 4 via a supporting member 100, respectively. A first link member 102 is fixed to each end portion of the rotating shaft 96. The first link member 102 is pivotably connected to each of second link members 104 pivotably mounted on both end portions of the upper shutter member 48.

In the illustrated embodiment, an air supply passage 106 is provided to convey a powder within each of the metering chambers 44 by air under pressure. The air supply passage 106 includes a passage formed in the sliding rod 72, a passage formed in the mounting block 74 and a passage formed in the upper shutter member 48, and each of its one ends is opened into the under surface of the forward end portion of the upper shutter member (each of these openings is provided corresponding to each metering chamber 44). The other end of the passage 106 is connected to a compressed air supply source A (FIG. 2) via a tube (not shown). A discharge tube 108 is fixed to each of the discharge openings formed at the bottom wall 6e of the housing 4, and an inclined portion inclined inwardly downwardly is formed in an intermediate portion of one side end of the upper shutter member 48.

The operation and result of the powder feeding apparatus having the structure described above will be described. When the cylinder mechanism 62 is stretched, the upper shutter member 48 is moved to the left in FIGS. 1 and 2 via the connecting member 68, the connecting rod 70 and the pair of sliding rods 72. As a result, the pinions 56 are revolved counterclockwise as shown by an arrow 110 (FIG. 2), and the lower shutter member 50 is moved in a direction opposite to the moving direction of the upper shutter member 48, namely to the right in FIGS. 1 and 2. During the movement of the upper shutter member 48, the first link members 102 are revolved via the second link members and the agitation means 94 is revolved clockwise in FIG. 2. Thus, the powder within the holding space P is agitated.

When the cylinder mechanism 62 is stretched and moved as described above, the upper shutter member 48 covers the upper opening of each metering chamber 44, and the lower shutter member 50 opens the lower opening of each metering chamber 44, whereby the powder metered in each metering chamber 44 is discharged from the lower opening through each cylindrical member 84 and the dischargaing tube 108. During the discharging of the powder, compressed air is supplied from the compression air supply source A to each metering chamber 44 through the air supply passage 106, and by the action of the compressed air, the powder is surely discharged from each metering chamber 44, and conveyed.

When the cylinder mechanism 62 is contracted, the upper shutter member 48 is moved to the right in FIGS. 1 and 2 via the connecting member 68, the connecting rod 70 and the pair of sliding rods 72. As a result, the pinions 56 are revolved clockwise as shown by an arrow 112 (FIG. 2), and the lower shutter member 50 is moved to the left in FIGS. 1 and 2. During the movement of the upper shutter member 48 to the right, the agitation means 94 is rotated counterclockwise in FIG. 2 via the second link members 104 and the first link member 102. Thus, the powder in the holding space P is agitated at this time. Consequently, the upper shutter member 48 opens the upper opening of each metering chamber 44 and the lower shutter member 50 covers the lower opening of each metering chamber 44, whereby the powder held in the holding space P flows into each metering chamber 44 from the upper opening.

The above operation is repeated by the stretching and contracting of the fluid pressure cylinder mechanism 62, and the powder in the holding space P is continuously discharged in a predetermined amount.

The amount of the powder to be discharged from the metering chamber 44 is adjusted by revolving the adjusting rod 34 or 40. When an operating handle (not shown) is mounted on the other end of the adjusting rod 34 and the rod 34 is revolved in a predetermined direction (or in a direction opposite to it), the metering adjusting member 24 is moved toward (or away from) the stationary member 12 along the mounting recess 30 of the movable member 26 and the metering recess 22 of the stationary member 12, and the volume of the metering chamber 44 is decreased (or increased). Accordingly, when this operation is carried out, the volumes of the metering chambers 44 are individually adjusted. On the other hand, when an operating handle (not shown) is mounted on the other end of the adjusting rod 40 and the rod 40 is revolved in a predetermined direction (or in a direction opposite to it), the movable member 26 on which the metering adjusting members 24 are mounted is moved toward (or away from) the stationary member 12, and the volumes of the metering chambers 44 are simultaneously decreased (or increased). Hence, by the above operation, the volumes of all the metering chambers 44 are adjusted at a time.

Now, with reference to FIGS. 3 to 5, the second embodiment of the powder feeding apparatus constructed in accordance with this invention will be described.

Figure 3:
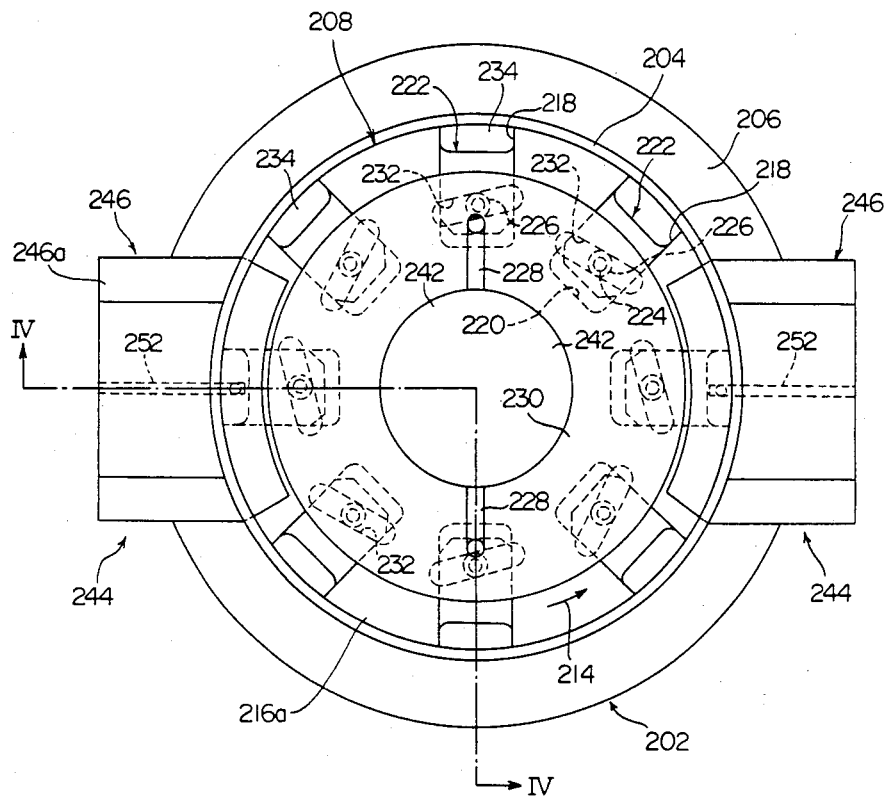
FIG. 3 is a top plan view showing a second embodiment of the powder feeding apparatus constructed in accordance with this invention.
Figure 4:
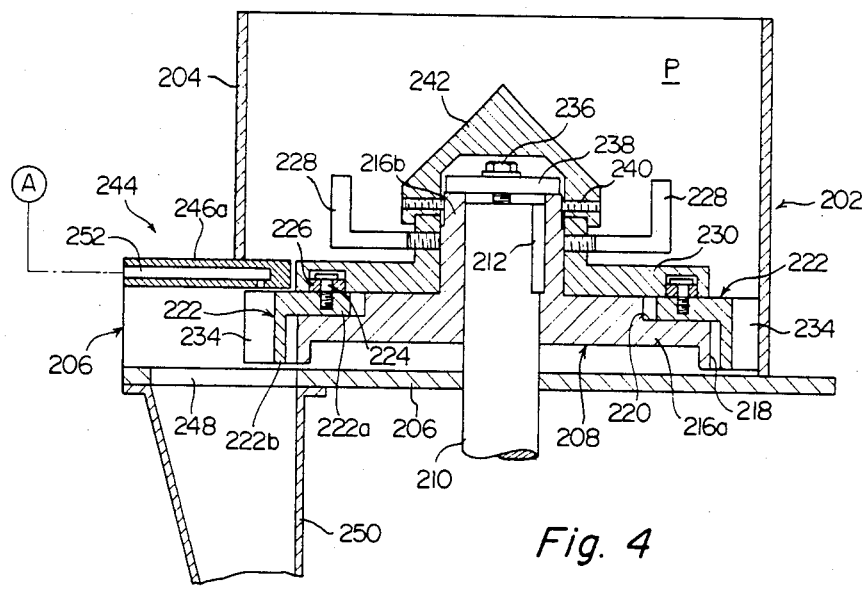
FIG. 4 is a sectional view taken on line IV—IV of FIG. 3.
Figure 5:
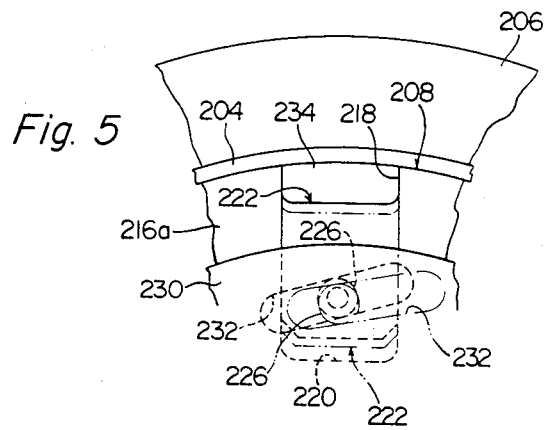
FIG. 5 is a view for illustrating the adjustment of the volume of a metering chamber in the powder feeding apparatus of FIG. 3.

In FIGS. 3 and 4, the illustrated powder feeding apparatus includes a powder storage receptacle 202 secured to the upper surface of the lower section (not shown) of the apparatus, and the storage receptacle 202 has a cylindrical side wall 204 and a bottom wall 206. In the lower portion of a space defined by the side wall 204 and the bottom wall 206, a disc-like turntable 208 (constituting a metering section) is disposed. In the lower section of the apparatus, a driving shaft 210 drivingly connected to a driving source (not shown) is rotatably supported, and the upper end portion of the driving shaft 210 projects into the aforesaid space through the bottom wall 206. The turntable 208 is mounted on the projecting upper end portion of the driving shaft 210 via a key member 212. Accordingly, the turntable 208 is turned counterclockwise as shown by an arrow 214 (FIG. 3) by a driving source (not shown). The turntable 208 has a disc portion 216a and a boss portion 216b, and a plurality of (8 in the illustrated embodiment) circumferentially spaced metering recesses 218 (constituting metering spaces) for defining metering chambers and guide depressions 220 extending radially inwardly from the bottoms of the metering recesses 218 are formed on the peripheral edge part of the disc-like portion 216a. As will be understood from the description given hereinafter, each metering recess 218 preferably has a substantially recutangular cross-sectional shape. A nearly L-shaped metering adjusting member 222 is slidably disposed at the bottom of each of the metering recesses 218. Each of the metering adjusting member 222 has a mounting portion 222a and a downwardly extending portion 222b. The mounting portion 222a is disposed within the guide depression 220 so as to be movable along the guide depression 220, and the downwardly extending portion 222b is disposed at the bottom of the metering recess 218 so as to be movable along the recess 218. A mounting pin 224 is set firmly on the upper surface of the mounting portion 222a of each metering adjusting member 222, and a follower roller 226 is rotatably mounted on each mounting pin 224. A portion adjusting table 230 is mounted on the boss portion 216b of the turntable 208 by means of L-shaped mounting members 228. As shown in FIG. 3, the position adjusting table 230 is disc-like, and a plurality of circumferentially spaced cam grooves 232 are formed on the undersurface of its peripheral edge portion (in the illustrated embodiment, eight cam grooves are formed correspondingly to the metering recesses 218 provided in the turntable 208). Each of the cam grooves 232 is inclined at a predetermined angle to the radial direction of the position adjusting table 230, namely to the sliding direction of each metering adjusting member 222 disposed in the metering recess 218 of the turntable 208 as will be understood from the following description. Each of the follower rollers 226 mounted on the metering adjusting members 222 is received in each cam groove 232. In the present embodiment, therefore, each of the metering chambers 234 for metering a powder is defined by the inner surface of the side wall 204, both side surfaces of the metering recess 218 formed in the turntable 208, and the forward end surface of the downwardly extending portion 222b of the metering adjusting member 222 disposed in the metering recess 218. The volume of each metering chamber 234 is changed by moving the metering adjusting member 222 along the metering recess 218 toward or away from the inside surface of the side wall 204. In the illustrated embodiment, an anchoring member 238 is fixed to one end of the driving shaft 210 by means of a bolt 236, and a cover member 242 is mounted on the boss portion 216b of the turntable 208 by a mounting screw 240 so as to cover the anchoring member 238. Accordingly, it will be readily appreciated from FIG. 4 that in the second embodiment, the side wall 204 of the powder storage receptacle 202, the cover member 242 and the position adjusting table 230 define a holding space P for holding a powder, and the powder in the space P is caused to flow into the metering chambers 234 located beneath it.

In the powder feeding apparatus described above, powder discharging portions 244 are disposed on opposite sides of the powder storage receptacle 202. A cylindrical discharge housing 246 is provided in each of the powder discharge portions 244, and its upper wall 246a projects inwardly through the side wall 204 of the powder storage receptacle 202. Discharge openings 248 (only one of them is shown in FIG. 4) are formed at the bottom wall 206 in the powder discharge sections 224. A discharge tube 250 is fixed to the underside of each discharge opening 248. In the illustrated embodiment, two air supply passages 252 are further provided for conveying the powder in the metering chambers 234 with air under pressure (Ref. FIG. 3). Each air supply passage 252 includes a passage formed in the upper wall 246a of the discharge housing 246, and its one end is opened to the undersurface of the forward end portion of the upper wall 246a (one of the air supply passages is shown in FIG. 4). The other end of the passage 252 is connected to a compression air supply source A (FIG. 4) via a tube (not shown).

The operation and result of the second embodiment will be described. As the turntable 208 revolves in the direction of the arrow 214 by the action of a driving source (not shown), the powder within the holding space P flows into the metering chamber 234 between the powder discharging portions 244 since the lower opening of the metering chamber 234 is closed by the bottom wall 206 but its upper opening is remains open. When the metering chamber 234 is then conducted to the powder discharge portion 244, the upper opening of the metering chamber 234 is closed by the upper wall 246a of the housing 246 on the incoming side of the portion 244, and the powder to be fed is metered by a predetermined amount in the metering chamber 234. When the metering chamber 234 is positioned on the discharge opening 248 of the bottom wall 206, the lower opening of the metering chamber 234 is opened although its upper opening is closed by the upper wall 246a. Consequently, the powder in the metering chamber 234 is discharged through the lower opening of the metering chamber 234, the discharge opening 248 and the discharge tube 250. At the time of discharging the powder, compressed air is supplied to the metering chamber 234 located on the discharge opening 248 through the air supply passage 252, and by the action of compressed air, the powder in the metering chamber 234 is surely discharged and conveyed. In the present embodiment, it will be easily understood from FIG. 4 that during the rotation of the turntable 208, the securing members 228 for fixing the position adjusting table 230 are also revolved and by the action of the securing members 228, the powder in the holding space P is agitated as required.

The above operation is carried out continuously by the revolving of the turntable 208 in the direction of arrow 214, and the powder within the holding space P is metered in the metering chamber 234 and continuously discharged by a predetermined amount.

The amount of the powder discharged from the metering chamber 234 is adjusted by revolving the position adjusting table 230 relative to the turntable 208. More specifically, when the securing members 228 are removed in a determined direction, the position adjusting table 230 becomes rotatable with respect to the turntable 208. When in this state the position adjusting table 230 is revolved by a predetermined angle clockwise in FIG. 3 with respect to the turntable 208 (as will be understood from FIG. 4, this operation is carried out by holding the cover member 242 and revolving the position adjusting table 230 in a predetermined direction), the follower roller 226 mounted on each metering adjusting member 222 is moved relative to the cam groove 232 formed in the position adjusting table 230, and the metering adjusting member 222 is held at a second position shown by a two dot chain line in FIG. 5 removed from a first position shown by a solid line in FIG. 5 along the metering recess 218. As a result, the volumes of the individual metering chambers 234 are simultaneously increased. On the other hand, when the position adjusting table 230 is revolved counterclockwise in FIG. 3 relative to the turntable 208, the volumes of the individual metering chambers 234 are simultaneously decreased. Accordingly, in the present embodiment, the volumes of all of the metering chambers 44 are adjusted at a time.

While the powder feeding apparatus constructed in accordance with this invention have been described with respect to its specific embodiments, it should be understood that the present invention is not to be limited to these specific embodiments, and various changes or modifications are possible without departing from the scope of this invention.

For example, in the illustrated embodiments, the metering space is constructed of a recess. If desired, the metering space may be constructed of a through-hole.

What is claimed is:

1. A powder metering and feeding apparatus, comprising:
   a powder storage receptacle with an open under surface;
   metering means positioned below the open under surface of said receptacle, said metering means including a stationary member having a plurality of metering chambers formed therein at predetermined intervals, each of the metering chambers havig an upper opening for receiving the powder from said receptacle and a lower opening for discharging the powder;
   an upper shutter member for selectively opening and closing the upper opening of the metering chambers;
   a lower shutter member for selectively opening and closing the lower opening of the metering chambers;
   means for opening and closing movement of said upper and lower shutter members; and
   metering adjustment means for adjusting the volumes of the metering chambers, said metering adjustment means including a movable member for simultaneously adjusting the volume of the metering chambers and a plurality of adjusting members movably mounted on said movable member for separately adjusting the volume of each of the metering chambers and slidably disposed in the metering chambers, whereby by moving said movable member all of said adjusting members are simultaneously moved so as to simultaneously adjust the volume of each of the metering chambers and by moving individually each of said adjusting members the volume of each of the metering chambers is individually adjusted separate from one another.

2. The apparatus of claim 1 further comprising agitation means rotatively mounted in said receptacle; and linkage means connecting said agitation means to said upper shutter member such that said agitation means is revolved when said upper shutter member is moved for opening and closing the upper opening of the metering chambers.

3. The apparatus of claim 1 further comprising first rack means secured to the underside of said upper shutter member;

second rack means secured to the upper surface of said lower shutter member;

a pinion positioned between said first and second rack means, such that when said upper shutter member is moved for opening said lower shutter member is moved for closing, and when said upper shutter member is moved for closing said lower member is moved for opening.

* * * * *